United States Patent [19]

Rudolph

[11] Patent Number: 5,388,788
[45] Date of Patent: Feb. 14, 1995

[54] HINGE FAIRINGS FOR CONTROL SURFACES

[75] Inventor: Peter K. C. Rudolph, Seattle, Wash.

[73] Assignee: The Boeing Company, Seattle, Wash.

[21] Appl. No.: 168,456

[22] Filed: Dec. 16, 1993

[51] Int. Cl.⁶ ............................................. B64C 3/50
[52] U.S. Cl. .................................... 244/215; 244/213; 244/212; 244/87
[58] Field of Search ............... 244/215, 214, 213, 204, 244/212, 87, 89

[56] References Cited

U.S. PATENT DOCUMENTS

| | | | |
|---|---|---|---|
| 1,540,105 | 6/1925 | Cook, Jr. | 244/214 |
| 2,458,896 | 1/1949 | Darby | 244/87 |
| 4,015,787 | 4/1977 | Maieli et al. | 244/215 |
| 4,200,253 | 4/1980 | Rowarth | 244/214 |

FOREIGN PATENT DOCUMENTS

160422  7/1954  Australia ................ 244/214
3816431 11/1989 Germany ................ 244/213

Primary Examiner—Michael S. Huppert
Assistant Examiner—Anne E. Bidwell
Attorney, Agent, or Firm—Joan H. Pauly

[57] ABSTRACT

A new hinge fairing design for control surfaces such as ailerons, elevators, and rudders. By staggering the two curved hinge fairings, one mounted to the fixed airfoil and the other to the leading edge of the control surface, a curving load path is opened up that allows installation of hinge fittings and actuators without having to make cut-outs in the curved fairings. This principle makes it possible to keep the control surface faired and sealed over its entire span and during its entire motion range. This improves the effectiveness of the control surface. The principle of the present invention is applicable to trailing edge control surfaces of subsonic and supersonic airplanes and is of particular benefit for hinged leading edge flaps on a supersonic commercial transport.

32 Claims, 5 Drawing Sheets

HINGE FAIRINGS FOR CONTROL SURFACES

TECHNICAL FIELD

This invention relates to hinge fairings for control surfaces and, more particularly, to a system of hinge fairings in which a first fairing is carried by a fixed airfoil of an aircraft and a second fairing is carried by a movable control surface mounted on the airfoil, and the ends of the fairings are spaced apart in a chordal direction to increase available space for accommodating structure for hinge fittings and actuation.

BACKGROUND INFORMATION

Aircraft control surfaces, such as ailerons, rudders, and elevators, are typically mounted on a fixed airfoil and are pivotable from a neutral position in opposite directions. The sum of the pivotal deflections from the neutral position is commonly 60° and may be even higher in certain special applications. In order to maximize the control force on the aircraft created by the deflection of the control surface, it is necessary to avoid flow separation on the suction side of the control surface. One factor that can cause separation is discontinuities in the transition contour between the fixed airfoil and the deflected control surface. Therefore, it is desirable to maintain a smooth and continuous transition contour on at least the suction side regardless of the position of the control surface. Another condition that can cause separation is cross flow from the pressure side to the suction side. Sealing along the airfoil/control surface interface on at least one side of the control surface is, thus, generally required for all control surface positions.

Figure 1:
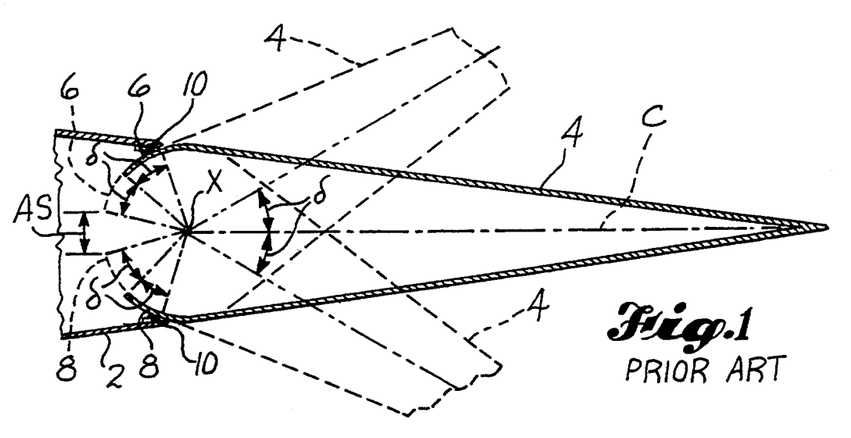
FIG. 1 is a schematic cross-sectional view of prior art fairings on a control surface on an airfoil.

FIG. 1 illustrates a common approach to the design of an airfoil/control surface interface that maintains a relatively smooth and continuous transition on the suction side and avoids cross flow for all control surface positions. The illustrated interface is between an aircraft wing 2 and a trailing edge aileron 4. The aileron 4 is mounted to pivot about a pivot axis X both upwardly and downwardly to a maximum deflection angle of δ. As shown, the deflection angle δ is 30°. Each of the upper and lower leading edges of the aileron 4 carries a curved fairing 6, 8. The upper and lower trailing edges of the wing 2 each have a fixed trailing edge panel that carries a seal 10 which seals against the adjacent fairing 6, 8. Each of the fairings 6, 8 overlaps its adjacent panel, and more specifically the seal 10 carried by the panel, by an angular distance equal to the angle of deflection δ. At least this much overlap is required to provide complete sealing throughout the deflection range of the aileron 4.

FIG. 1 shows the neutral position of the fairings 6, 8, when the aileron 4 is undeflected, in solid lines and the deflected positions in broken lines. This illustrates the requirement that there be room inside the wing structure for each of the fairings 6, 8 to move an angular distance of 2δ beyond its seal 10. When this requirement is met, the only remaining available space AS for hinge and actuation structure is extremely limited. The space AS is insufficient to accommodate known types of structure for hinge fittings and actuation.

Figure 2:
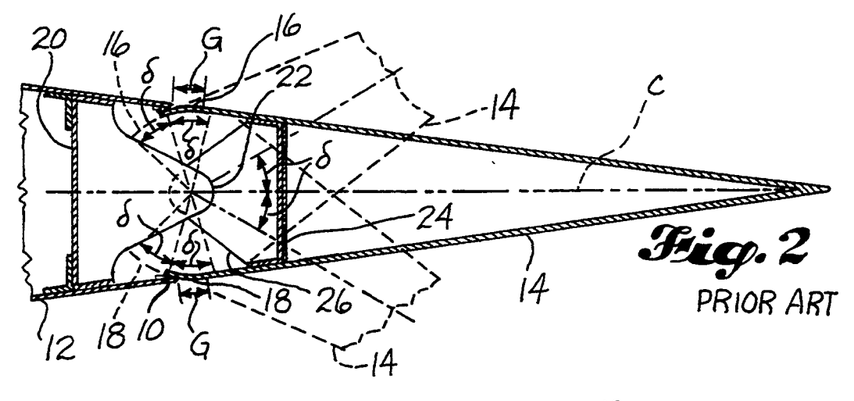
FIG. 2 is like FIG. 1 except that it shows a hinge location and illustrates trimming of the fairings.
Figure 3:
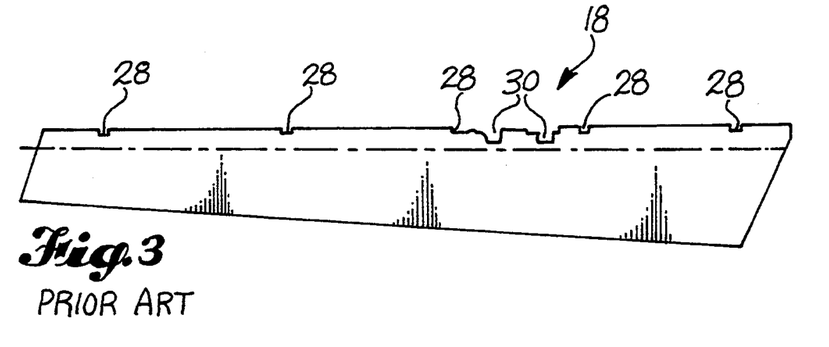
FIG. 3 is a plan view illustrating a typical trim pattern of the lower fairing shown in FIG. 2.

FIG. 2 illustrates a common practice that is employed to overcome the problem of insufficient space illustrated in FIG. 1. This practice is to trim the leading edge fairings 6, 8 at key locations to reduce or eliminate the overlap between the fairings and the wing's fixed trailing edge. FIG. 2 shows an aileron 14 pivotally mounted on the trailing edge of a wing 12. The trimmed upper and lower fairings are represented by the reference numerals 16, 18, respectively. As in FIG. 1, each of the corresponding trailing edges of the wing 12 has a fixed panel that carries a seal 10. FIG. 2 schematically represents a hinge location at which the overlap has been eliminated to provide space for hinge fittings 22, 26 mounted on spars 20, 24 that are a part of the structure of the wing 12 and the aileron 14, respectively. Because of the elimination of the overlap, the space beyond the seals 10 required for the fairings 16, 18 is δ, rather than 2δ, as in FIG. 1. FIG. 3 shows a typical trim pattern on the lower leading edge fairing 18 of an aileron. As shown in FIG. 3, the trim locations include five hinge fitting locations 28 and two actuator locations 30.

While the approach illustrated in FIGS. 2 and 3 solves the problem of inadequate space, it presents another problem. When the control surface 14 is deflected downwardly, a gap G opens up on the upper suction side of the control surface 14. Even though the trimming is done only locally, where required for hinges and actuators, the gaps on the suction side can cause substantial downstream flow separation which diminishes the effectiveness of the control surface and produces drag.

The problems discussed above are illustrated and described in terms of a wing trailing edge aileron. The same problems also apply to other types of control surfaces, including leading edge control surfaces, both leading edge and trailing edge control surfaces on structures other than wings, such as elevators, and vertical control surfaces, such as rudders. In the last-mentioned case, deflection would be in opposite lateral directions rather than up and down.

SUMMARY OF THE INVENTION

The basic concept of the invention is to provide only one fairing on the control surface and to install the second fairing on the fixed airfoil.

A basic aspect of the invention is a system for providing a smooth transition between a fixed airfoil of an aircraft and a movable control surface mounted on the fixed airfoil and having a neutral position and a deployed position. The system comprises first and second curved fairings carried by the airfoil and the control surface, respectively. First and second edge portions are carried by, and are fixed in position relative to, the airfoil and the control surface, respectively, opposite the fairing carried thereby. The first and second edge portions are positioned adjacent to the second and first fairings, respectively. The fairings and the edge portions together define an interface between the airfoil and the control surface. At least one of the fairings overlaps the adjacent edge portion when the control surface is in its neutral position. This fairing has an outer surface that is sealingly engaged by the adjacent edge portion when the control surface is in its neutral position and is sufficiently close to the adjacent edge portion when the control surface is in its deployed position to provide a substantially aerodynamically smooth transition between the outer surface and the adjacent edge portion. The other fairing has an outer surface that is sufficiently close to the adjacent edge portion to provide a substantially aerodynamically smooth transition between it and the adjacent edge portion when the control surface is in either its neutral position or its deployed position. Preferably, said one of said fairings is sealingly engaged when the control surface is in its deployed position, and said other of said fairings is sealingly engaged when the control surface is in its neutral position. The system may also have additional preferred features, as discussed below.

Another basic aspect of the invention is a system for providing a smooth transition between a fixed airfoil of an aircraft and a movable control surface mounted on the fixed airfoil. The control surface has a neutral position and is movable in a first direction to a first deployed position and in a second opposite direction to a second deployed position. The system comprises first and second fairings carried by the airfoil and the control surface, respectively. First and second edge portions are carried by, and are fixed in position relative to, the airfoil and the control surface, respectively, opposite the fairing carried thereby. The first and second edge portions are positioned adjacent to the second and first fairings, respectively. The fairings and the edge portions together define an interface between the airfoil and the control surface. At least one of the fairings is curved and overlaps the adjacent edge portion when the control surface is in its neutral position. This fairing has an outer surface that is sealingly engaged by the adjacent edge portion when the control surface is in either of its neutral position and one of its deployed positions. The outer surface is sufficiently close to the adjacent edge portion, when the control surface is in its other deployed position, to provide a substantially aerodynamically smooth transition between the outer surface and the adjacent edge portion. The other fairing has an outer surface that is sealingly engaged by the adjacent edge portion when the control surface is in its neutral position.

Preferably, each of the fairings is curved and overlaps the adjacent edge portion when the control surface is in its neutral position. The outer surface of said other fairing is sealingly engaged by the adjacent edge portion when the control surface is in said other deployed position and is sufficiently close when the control surface is in said one deployed position to provide a substantially aerodynamically smooth transition. Also preferably, each edge portion carries a flexible seal that sealingly engages the adjacent fairing. When maximum smoothness is desired, each edge portion preferably has a tapered end with an inwardly facing recess formed therein. The seal is positioned in the recess to help maximize the smoothness of the transition between the airfoil and the control surface.

It is also preferable that the fairings extend in opposite directions past a plane defined by a chord line and a hinge axis. In such an arrangement, the control surface pivots about the hinge axis between its neutral position and its deployed positions. The airfoil has a chord line at each point along the axis. When the control surface is in its neutral position, the fairings extend at each point along the axis in opposite directions past a plane perpendicular to the chord line and intersecting the axis. This arrangement has the advantage of staggering in the chordal direction the space needed by the fairings when the control surface deflects. This, in turn, effectively increases available space for hinge and actuation structure.

The system of the invention may be employed in connection with various types of control surfaces. One example is a control surface mounted on a trailing edge of an airplane wing. In such case, it is preferable that one of the fairings be an upper fairing carried by the control surface and that this upper fairing be curved and overlap its adjacent edge portion.

Another example of a control surface and airfoil combination into which the system of the invention may be incorporated is a control surface that is a leading edge flap and an airfoil that is a supersonic airplane wing. In this case, the fairings preferably comprise an upper fairing carried by the wing and a lower fairing, with the upper fairing being curved and overlapping its adjacent edge portion. In a preferred embodiment of a leading edge flap, the control surface pivots downwardly into its first deployed position, and, during this pivotal movement, the lower fairing is continuously sufficiently close to the adjacent edge portion to maintain a substantially aerodynamically smooth transition and the upper fairing is continuously sealingly engaged by its adjacent edge portion.

The invention solves the problem of maximizing the effectiveness of a control surface. The basic arrangement of fairings that characterizes the invention provides adequate space for hinge and actuation structure without incurring performance penalties. Gapping and cross flow are prevented for all positions of the control surface, and the associated decrease in effectiveness is avoided. All this is accomplished by means of structure that is no more complex than conventional fairing structure and is highly versatile so that it may be used in a wide variety of different types of airfoil control surface interfaces and with various types of actuators.

These and other advantages and features will become apparent from the detailed description of the best modes for carrying out the invention that follows.

BRIEF DESCRIPTION OF THE DRAWINGS

In the drawings, like element designations refer to like parts throughout, and:

FIGS. 7A–7C are like FIG. 5 except that they illustrate a different type of actuator at the interface. FIGS. 7A, 7B, 7C illustrate the neutral position, the downwardly deflected position, and the upwardly deflected position of the control surface, respectively.

BEST MODES FOR CARRYING OUT THE INVENTION

Figure 4:
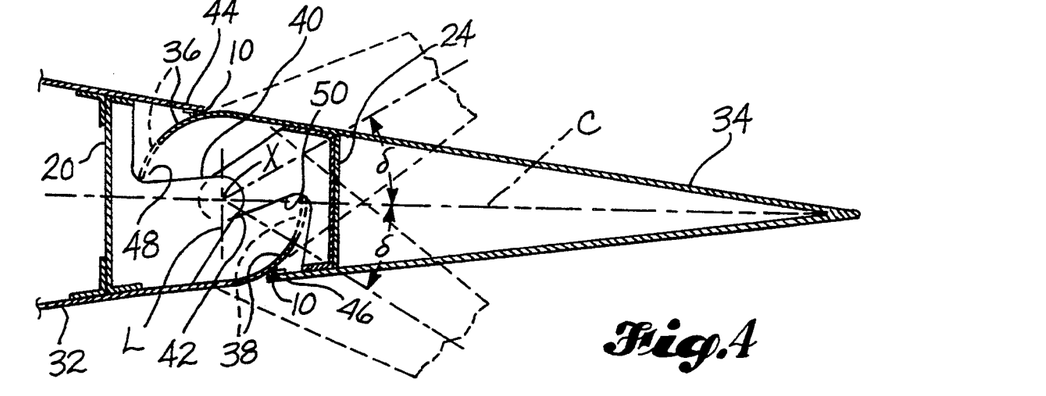
FIG. 4 is a schematic cross-sectional view of a first embodiment of the airfoil/control surface interface of the invention and shows a control surface hinge.
Figure 5:
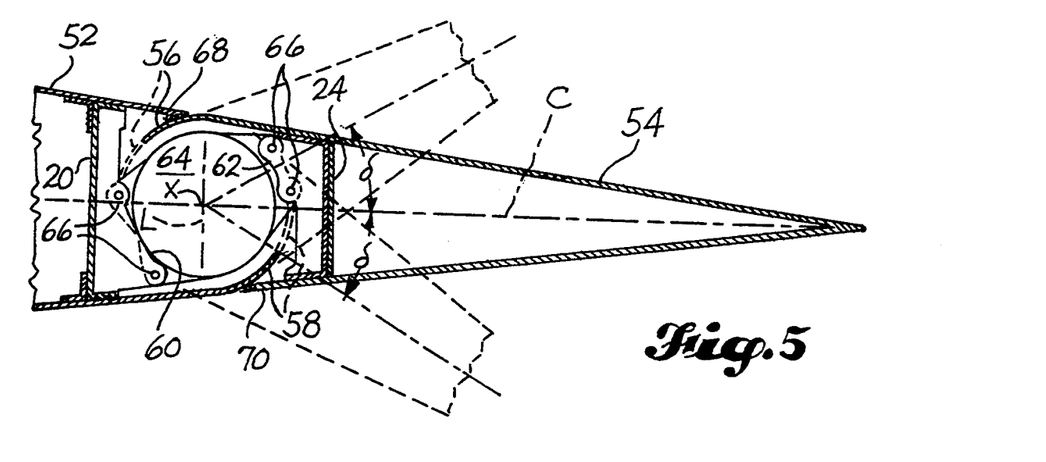
FIG. 5 is like FIG. 4 except that it shows another embodiment and illustrates a rotary actuator.
Figure 6:
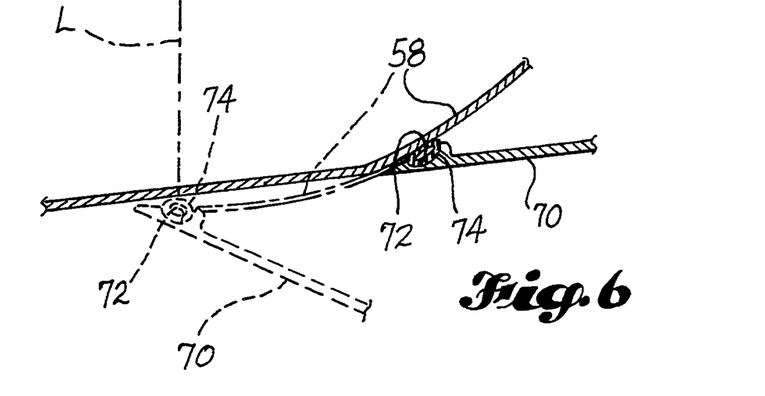
FIG. 6 is an enlarged fragmentary cross-sectional view of the lower fairing portion of FIG. 5.
Figure 7A:
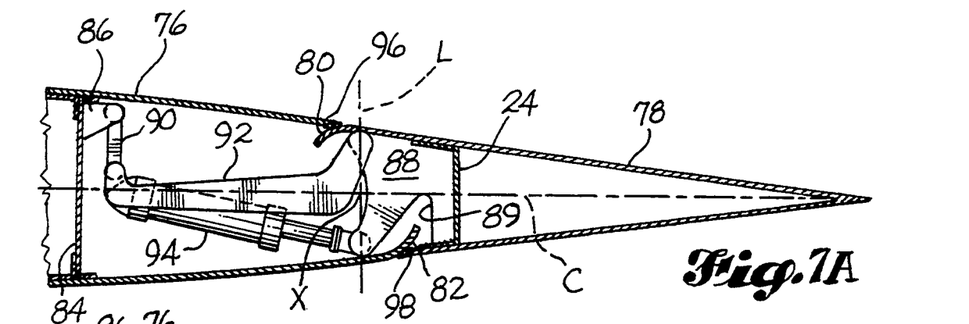
Figure 7B:
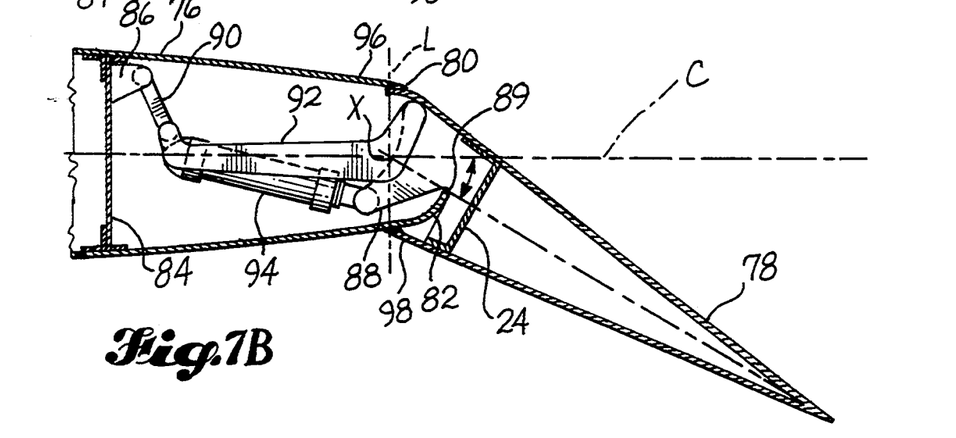
Figure 7C:
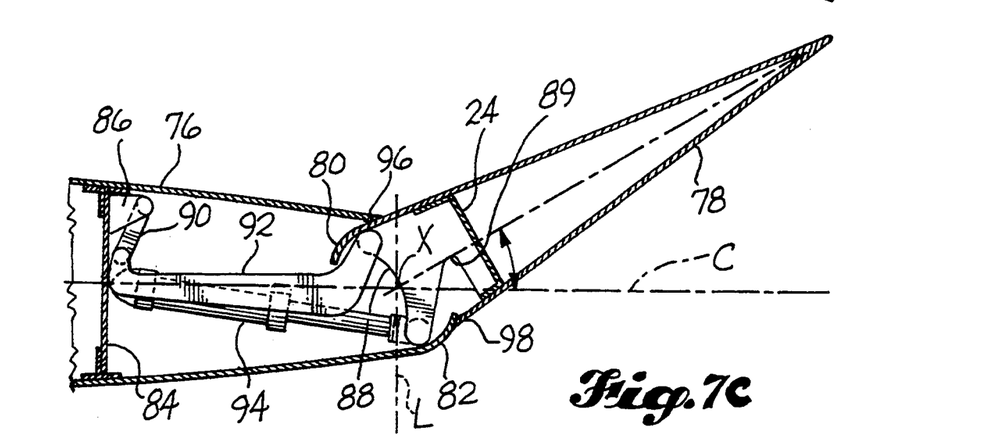
Figure 8A:
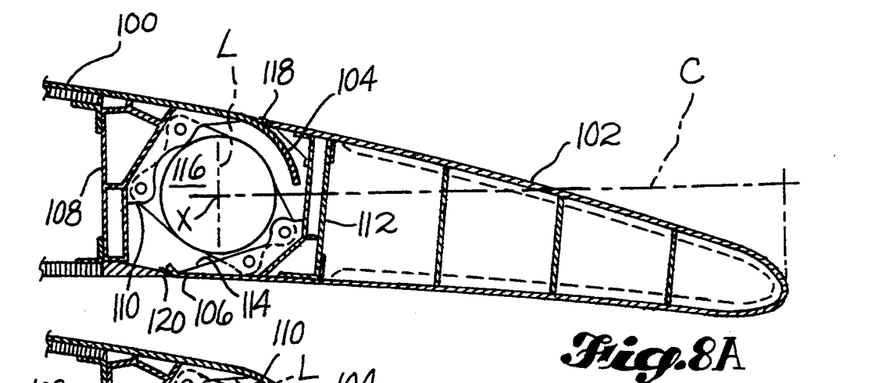
FIGS. 8A–8C are similar to FIGS. 7A–7C except that they illustrate a further embodiment of the invention used in connection with a leading edge flap for a supersonic airplane.
Figure 8B:
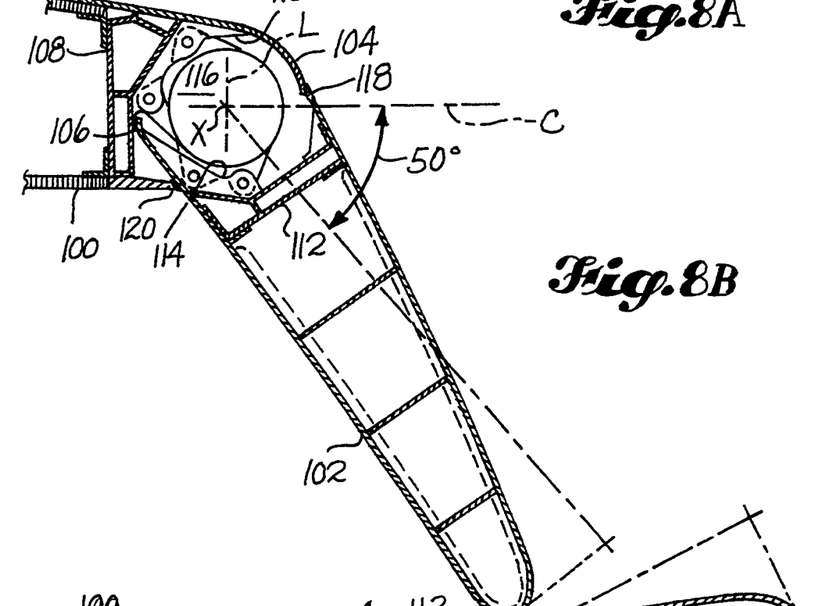
Figure 8C:
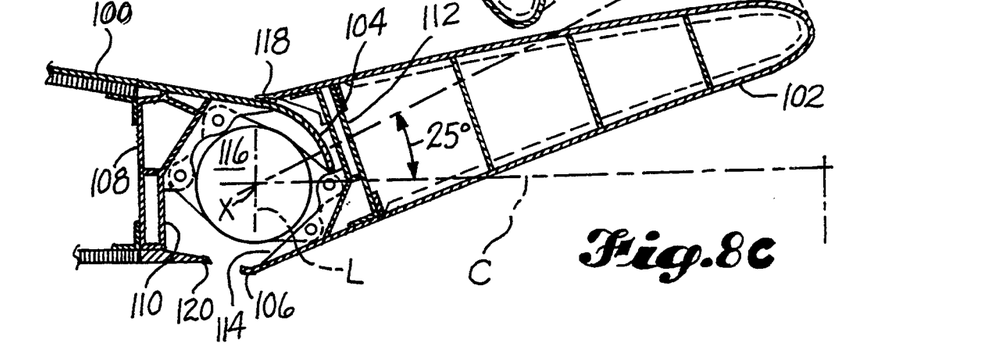

FIGS. 4–8 show three embodiments of the invention that constitute the best modes for carrying out the invention currently known to the applicant. FIG. 4 shows a first embodiment. FIGS. 5 and 6 show a second embodiment that is currently the preferred embodiment for certain types of control surfaces. FIGS. 7A–7C illustrate the same embodiment as shown in FIGS. 5 and 6 used in connection with a different type of actuator. FIG. 8 illustrates a third embodiment that is currently preferred for leading edge control surfaces for supersonic airplanes.

Referring to FIG. 4, an aileron 34 is pivotably mounted on the trailing edge of a fixed wing 32 of an aircraft. The interface between the wing 32 and the aileron 34 is defined by two curved fairings 36, 38 and corresponding edge portions 44, 46. The first fairing 36 is on the upper portion of the interface and is carried by the upper leading edge of the aileron 34. It preferably is an integral part of the leading edge. The second fairing 38 is carried by the lower trailing edge of the wing 32. The upper and lower edge portions 44, 46 are carried by the upper trailing edge of the wing 32 and the lower leading edge of the aileron 34, respectively. Preferably, the edge portions 44, 46 are formed by panels that are fixed to the structures 32, 34 that carry them. The panels 44, 46 are positioned to be adjacent to their corresponding fairings 36, 38.

Still referring to FIG. 4, the aileron 34 has a neutral cruise position shown in solid lines in FIG. 4. The aileron 34 is pivotable about a pivot axis X into an upper deployed or deflected position and a lower deflected position, both shown in broken lines in FIG. 4. As illustrated, the amount of deflection into each of the fully deployed positions is equal to the angle $\delta$ for a total deflection of $2\delta$. Each of the fairings 36, 38 is positioned to overlap its corresponding panel 44, 46 when the aileron 34 is in its neutral position. The outer surfaces of the overlapping fairings 36, 38 are sealingly engaged by their respective adjacent edge panels 44, 46 throughout the entire deflection range $2\delta$. The sealing engagement is accomplished by flexible bulb seals 10 carried by the edge panels 44, 46.

FIG. 4 illustrates the axial staggering of the fairing overlap and fairing travel clearance that is characteristic of the invention. When the aileron 34 is deflected into a deployed position, the fairings 36, 38 do not converge on each other as in the conventional arrangements illustrated in FIGS. 1–3 and discussed above. The staggering of the overlap and travel clearance leaves more room for hinge structure and actuation of the control surface 34.

FIG. 4 also illustrates one way in which maximum use of the additional room can be made. A hinge fitting 40 is secured to a wing spar 20 and pivotably engages a hinge fitting 42 secured to a control surface spar 24. The fittings 40, 42 define a hinge axis X. Rather than having the conventional hinge fitting configuration shown in FIG. 2, the fittings 40, 42 have an upper indentation 48 and a lower indentation 50, respectively, to provide room for the fairings 36, 38 when the control surface 34 is deployed. This hinge fitting configuration creates a curved, S-bend load path through the hinge joint but maintains structural integrity and smooth operation of the joint. Thus, the integrity of the hinge joint is not compromised, and, at the same time, no gaps develop at the hinge locations and therefore cross flow is prevented and added drag is eliminated throughout the entire deflection range of the control surface 34.

As noted above, the embodiment shown in FIG. 4 has a bulb seal 10 mounted on each of the edge panels 44, 46 to provide sealing engagement with the corresponding fairing 36, 38. Bulb seals are the most commonly used seals on control surfaces of today's subsonic airplanes. They are generally $\frac{3}{4}$ to one inch in diameter and are generally made from Dacron (trademark) fabric impregnated with silicone rubber. As can be seen in FIG. 4, the use of bulb seals results in a slight downstream step on the upper surface at the panel/fairing interface and a slight forward facing step on the lower surface. These steps cause some local flow disturbance that may degrade the effectiveness of the control surface and may cause drag. This is especially true with respect to the forward facing step on the lower surface. The flow disturbance and drag penalties may be unacceptable in some types of aircraft and with respect to some types of control surfaces. For example, they may be unacceptable with regard to trailing edge control surfaces in high performance airplanes, especially supersonic airplanes. They may also be unacceptable in connection with a leading edge control surface. The boundary layer is thinner on a leading edge than a trailing edge and, thus, may not hide a step that would be hidden by the thicker boundary layer on a trailing edge. Therefore, a smoother fairing interface is desirable on leading edge devices and on high performance airplanes, such as supersonic transport airplanes.

FIGS. 5–8 illustrate the currently preferred approach to obtaining a smoother interface. Referring to FIGS. 5 and 6, each edge panel 68, 70 shown therein has a sharp-lipped tapered end with an inwardly facing recess 72 formed thereon. A flexible seal 74 is positioned in the recess 72. The seal 74 may be made from silicone rubber impregnated Dacron for subsonic airplanes. Materials with more resistance to heat may be required on seals for supersonic airplanes. The sharp-lipped end rides over the curved fairing 56, 58 with a close tolerance. The seal 74 slides on the fairing 56, 58 and sealingly engages the fairing 56, 58 when movement of the control surface 54 causes the fairing 56, 58 to move outwardly relative to its adjacent panel 68, 70 and when the fairing 56, 58 is in its neutral position. The close tolerance fit of the fairing 56, 58 and adjacent panel 68, 70 makes it impractical to maintain sealing engagement on both upper and lower surfaces throughout the entire deflection range $2\delta$. Therefore, in order to provide clearance for the tapered end of the panel 68, 70 relative to the fairing 56, 58, when the adjacent members 56, 68 or 58, 70 converge, the radius of the fairing 56, 58 is larger than tangential to the outer contour of the panel edge 68, 70, as illustrated in FIG. 6. The result is that there is a slight gap between the lower fairing 58 and the adjacent panel 70 when the control surface 54 is deflected downwardly, and between the upper fairing 56 and the adjacent panel 68 when the control surface is deflected upwardly. The gap on the lower surface is illustrated in FIG. 6. The gap is very slight, and the tapered panel end 70 remains close enough to the fairing 58 so that the interface therebetween is at least substantially aerodynamically smooth throughout the entire deflection range. This is also true of the upper fairing/panel interface 56, 68. (It should be noted that, as described herein, the curved fairings are considered to include the relatively straight portion of the airfoil or control surface that is adjacent to the tapered end when the fairing and edge panel increase their overlap as shown in FIG. 6.)

Referring again to FIG. 5, as in FIG. 4, an aileron 54 is mounted on a fixed wing 52 and is pivotable from a neutral position into upper and lower deployed positions. The fairing and edge panel arrangement 56, 58, 68, 70 is substantially the same as in FIG. 4, with the major difference of the recessed seal feature discussed above. When the aileron 54 is moved downwardly into its lower deployed position, the upper panel 68 provides a smooth turning radius and remains in sealing engagement with the upper fairing 56. The lower panel 70 remains closely adjacent to the lower fairing 58 to provide a substantially aerodynamically smooth transition between the fairing 58 and the panel 70. When the aileron 54 is deflected upwardly into its upper deployed position, the outer surface of the lower fairing 58 provides a smooth turning radius and remains in sealing engagement with the lower panel 70. The upper panel 68 remains closely adjacent to the upper fairing 56 to provide a substantially aerodynamically smooth transition between upper panel 68 and upper fairing 56. In any of the positions of the aileron 54, at least one of the upper and lower surfaces is sealed to prevent cross flow from the on-pressure to the suction side. The other interface portion (on-pressure side) is at least substantially aerodynamically smooth to minimize drag.

FIG. 5 also illustrates one way in which a rotary actuator 64 may be mounted in the additional room provided by the staggered configuration of the interface of the invention. First and second actuator attachment fittings 60, 62 are secured to a wing spar 20 and a control surface spar 24, respectively. Each fitting 60, 62 has two attachment locations 66 at which the actuator 64 is attached. These locations 66 are positioned in a manner similar to the interengaging portions of the fittings 40, 42 shown in FIG. 4 to make optimal use of the available room and provide clearance for the fairings 56, 58. The actuator 64 is operated to pivot the control surface 54 about a concentric pivot axis X into its upper and lower deployed positions. As in the arrangement shown in FIG. 4, the load path through the joint is curved.

FIG. 7 illustrates the embodiment of the invention shown in FIGS. 5 and 6 used in connection with a different type of control surface actuator generally referred to as a linear hydraulic actuator. The linear hydraulic actuator is the most commonly used actuator on today's subsonic commercial airliners and powers ailerons, elevators and rudders. There are generally two, sometimes three, actuators per control surface. The aileron 78 pivots about a pivot axis X relative to a wing 76 on which it is mounted (the hinge fitting is not shown). The aileron 78 carries an upper fairing 80 and a lower leading edge panel 98 that interact with an upper trailing edge panel 96 and a lower fairing 82, respectively, carried by the wing 76 in the same manner that the fairings and panels shown in FIGS. 5 and 6 interact. FIG. 7A shows the neutral position of the aileron 78. The lower and upper deflected positions are shown in FIGS. 7B and 7C, respectively.

The actuator is mounted by means of a kick link attachment fitting 86 secured to a wing spar 84 and an actuator attachment fitting 88 secured to a control surface spar 24. The hydraulic actuator 94 is mounted by means of a pair of kick links 90 and a pair of reaction links 92 each of which straddles the actuator 94. Each kick link 90 has a first end pivotally attached to the fitting 86 and an opposite end pivotally attached to one end of the corresponding reaction link 92. The other end of each reaction link 92 is pivotally attached to the upper portion of the attachment fitting 88. A first end of the actuator 94 is pivotally attached to the reaction links 92 just below the attachment points of the links 92 to the corresponding kick links 90. The other end of the actuator 94, the piston rod end as shown in FIGS. 7A–7C, is pivotally attached to the lower portion of the attachment fitting 88. The movements of the actuator 94 and the links 90, 92 are illustrated in FIGS. 7A–7C.

Referring to FIG. 7B, the actuator attachment fitting 88 has a downwardly facing indentation 89 that provides room for the lower fairing 82 when the aileron 78 is deflected downwardly. The dog-legged configuration of the reaction links 92 provides room for the upper fairing 80 when the aileron 78 is deflected upwardly, as shown in FIG. 7C. As shown, the upper and lower portions of the structure adjacent to the interface are symmetrical about a horizontal symmetry plane, and the pivot point X is in this plane. The connections of the actuator rod and reaction links 92 to the fitting 88 are at equal distances relative to the pivot point X.

FIGS. 4–7 show a horizontal control surface and are described in terms of a trailing edge control surface on an aircraft wing. The invention may also be used on other types of control surfaces. For example, an elevator on a tail plane would preferably have one of the interface arrangements shown in FIGS. 4–7. In the case of a rudder, the same arrangement could be used except that the rudder would move in opposite lateral directions rather than up and down.

FIG. 8 illustrates yet another application of the invention in which a leading edge flap 102 is mounted on a fixed supersonic airplane wing 100. An upper curved fairing 104 is carried by the upper leading edge of the wing 100. A lower fairing 106 is carried by the lower trailing edge of the flap 102. The lower fairing 106 has a substantially straight configuration with a curved end portion that provides a seal when the flap 102 is in its neutral position. The flap 102 is powered by a rotary actuator 116. The actuator 116 is mounted in a manner similar to the actuator 64 shown in FIG. 5. A first actuator attachment fitting 110 is secured to a wing spar 108, and a second actuator attachment fitting 114 is secured to a flap spar 112. The actuator 116 is co-axial with the pivot axis X of the flap 102. Two of the actuators 116 actually form the two hinges for each flap 102.

In the operation of the supersonic airplane, a very smooth surface on the wing/flap airfoil is required for high speed cruising. The high speed cruise configuration in which the flap 102 is in its neutral position, is shown in FIG. 8A. In order to maximize the smoothness of the interface, the upper and lower edge portions 118, 120 that engage the fairings 104, 106 preferably have the type of seal arrangement shown in FIGS. 5–7 and described above. In the cruise configuration shown in FIG. 8A, the upper edge panel 118 carried by the flap 102 sealingly engages the upper fairing 104, and the lower edge panel 120 carried by the wing 100 sealingly engages the outer curved end of the lower fairing 106. The flap 102 is moved by the actuator 116 into downwardly deflected positions. The maximum downward deflection of 50° is illustrated in FIG. 8B. This position is used during landing approach at low speeds. Intermediate positions, up to about 20° downward deflection, are used for transitional speeds such as acceleration, deceleration, and transonic cruise for sonic boom avoidance.

The embodiment shown in FIGS. 8A–8C provides sealing of the interface for all flap positions between 0° and 50° down, including the 0° and 50° down positions. A pressure seal is provided on the upper suction surface, and an aerodynamic seal is maintained on the lower surface. In other words, the seal 74 carried by the upper edge portion 118 continuously engages the upper fairing 104, and the lower edge portion 120 remains sufficiently close to the lower fairing 106 to continuously provide a substantially aerodynamically smooth transition between the edge portion 120 and the fairing 106. The flap up position is illustrated in FIG. 8C. In this position, the flap 102 is deflected upwardly 25° in order to facilitate landing flare. When the flap 102 is moved into this orientation preparatory to landing, there is no sealing requirement on the lower surface of the flap/wing interface. Thus, the lower gap shown in FIG. 8C is acceptable. An aerodynamic seal is provided on the upper surface by close proximity of the upper seal 74 to the upper fairing 104.

The maximum total flap deflection illustrated in FIGS. 8A–8C is 75°. This range of deflection would not be possible with conventional hinge fairings without large holes in the fairings at hinge/actuator locations and without major, and unacceptable, discontinuities in the high speed configurations. The embodiment of the invention shown in FIG. 8 meets the airplane's requirements for aerodynamic smoothness and sealing while, at the same time, providing a large enough load path and space for the rotary actuator drive.

As shown in FIGS. 4–7, the fairing system of the invention can provide complete sealing around hinges and rotary or linear actuators throughout the full deflection range of a control surface and still provide adequate space for structure when the total deflection does not exceed 60°. In other words, when the total deflection does not exceed 60°, sealing of at least one of the upper and lower (or right and left) surfaces is provided throughout the deflection range. The sealing is continuous across the entire span because no trim cutouts for hinges or actuators, such as those shown in FIG. 3, are required. When the total deflection range is greater than 60°, such as in FIG. 8, it may not be possible to provide sealing throughout the entire deflection range. In the embodiment shown in FIG. 8, complete sealing around the rotary actuator 116 throughout the deflection range is not possible and is not required aerodynamically. Therefore, the embodiment of the invention illustrated in FIG. 8 is adapted to provide sealing for the neutral and downwardly deflected positions, when sealing is required, and to allow gapping only when the flap 102 is deflected upwardly and gapping is acceptable.

In the embodiments of the invention shown in FIGS. 4–8, the control surface has two opposite deployed positions. The invention may also be used to advantage in connection with control surfaces, including wing flaps, that only have a single deflection direction. With regard to such flaps, the avoidance of gaps achieved by the invention is important for improved lift, rather than for the type of control effectiveness that is of concern in the embodiments of FIGS. 4–8. One example of a control surface with a single deflection direction and with which the invention may be used advantageously is a leading edge flap of the type shown in FIG. 8 that has a 50° downward deflection but does not deflect upwardly. In such a flap, the fairings are preferably like those shown in FIG. 8, i.e. both fairings are preferably curved with the curved portion of the lower fairing being relatively short.

Figure 9A:
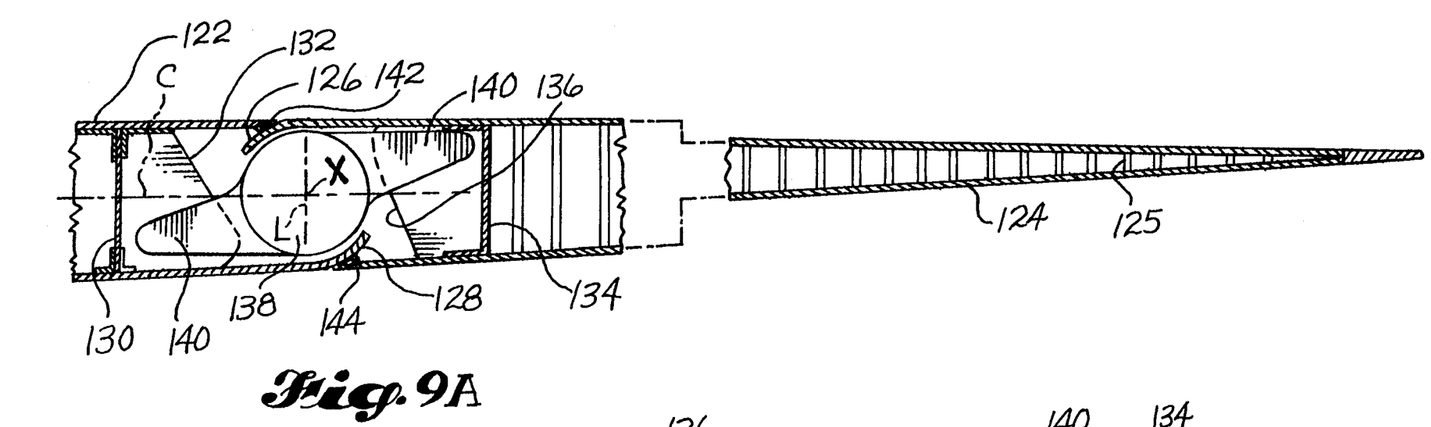
FIG. 9A is similar to FIG. 7A except that it illustrates a rotary hinge actuator for a thin outboard control surface.
Figure 9B:
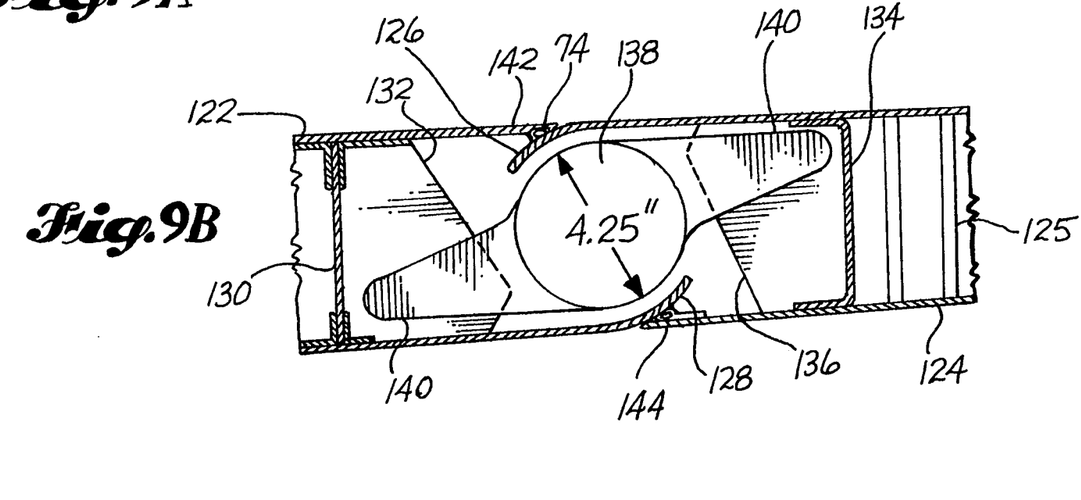
FIG. 9B is an enlarged cross-sectional view showing a portion of the apparatus shown in FIG. 9A.

FIG. 9 shows another example of a control surface/airfoil interface constructed in accordance with the invention. The control surface is a trailing edge control surface and may be either an aileron that deflects both upwardly and downwardly or a flap that deflects only downwardly. Referring to FIGS. 9A and 9B, the control surface 124 is mounted on the trailing edge of a wing 122. The control surface 124 is located on an outboard portion of the wing 122 where the airfoil/control surface thickness is very slight. Therefore, the control surface 124 has a honeycomb construction 125 for strength. A curved upper fairing 126 is carried on the leading edge of the control surface 124. A curved lower fairing 128 is carried on the trailing edge of the wing 122. Secured to a wing spar 130 and a control surface spar 134 are hinge fittings 132, 136, respectively.

Because of the very limited space in the thin interface between the wing 122 and the control surface 124, the configuration of the hinge and actuation structure must be especially adapted to fit into the available space. For this purpose, a rotary hinge actuator 138 with a diameter of only 4.25 inches is provided. The limited space requires that the actuator have two fingers 140 that are connected to the hinge fittings 132, 136 to mount the actuator 138 thereon. The fingers 140 are positioned to provide space for deflection of the fairings 126, 128.

Upper and lower edge panels 142, 144 are positioned adjacent to and engage the upper and lower fairings 126, 128, respectively. At least the upper edge panel 142 preferably includes a recessed seal 74 of the type shown in FIGS. 5–8 and described above. Preferably, the outer surface of the upper fairing 126 is sealingly engaged by the edge panel 142 when the control surface 124 is in its neutral or its lower deployed position. The fairing 126 and edge panel 142 are at least closely adjacent in the deployed position. The lower fairing 128 is sealingly engaged when the control surface 124 is in its neutral position and is at least closely adjacent when the control surface 124 is deflected downwardly.

In each of the illustrated embodiments of the invention, the pivot point of the control surface is at the symmetry plane of the airfoil on which it is mounted. It appears that the effectiveness of the invention is maximized in this type of arrangement. However, the invention may also be used in connection with control surfaces having an asymmetric pivot point arrangement.

The staggered configuration of the interface of the invention may be described in relation to the pivot axis and the chord lines of the airfoil. As described herein and shown in FIGS. 4–9, the control surface, e.g. the aileron 34 shown in FIG. 4, pivots about a hinge axis X between its neutral position and its deployed position or positions. At each point along the axis X, the airfoil on which the control surface is mounted has a chord line C. A plane, represented by the line L in FIGS. 4–9, may be drawn perpendicular to the chord line C and intersecting the axis X. When the control surface is in its neutral position, the fairings, at each point along the axis X, extend in opposite directions past the plane L.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A system for providing a smooth transition between a fixed airfoil of an aircraft and a movable control surface mounted on the fixed airfoil, said control surface having a neutral position and being movable in a first direction to a first deployed position and in a second opposite direction to a second deployed position, said system comprising:

first and second fairings carried by the airfoil and the control surface, respectively; and first and second edge portions carried by, and fixed in position relative to, the airfoil and the control surface, respectively, opposite the fairing carried thereby; said first and second edge portions being positioned adjacent to said second and first fairings, respectively;

said fairings and said edge portions together defining an interface between the airfoil and the control surface; and at least one of said fairings being curved and overlapping the adjacent edge portion when the control surface is in its neutral position, and having an outer surface that is sealingly engaged by the adjacent edge portion when the control surface is in either of its neutral position and one of said deployed positions, said outer surface being sufficiently close to the adjacent edge portion when the control surface is in the other of said deployed positions to provide a substantially aerodynamically smooth transition between said outer surface and the adjacent edge portion; and the other of said fairings having an outer surface that is sealingly engaged by the adjacent edge portion when the control surface is in its neutral position.

2. The system of claim 1, in which each said fairing is curved and overlaps the adjacent edge portion when the control surface is in its neutral position; and said outer surface of said other of said fairings is sealingly engaged by the adjacent edge portion when the control surface is in said other of said deployed positions, and is sufficiently close to the adjacent edge portion, when the control surface is in said one of said deployed positions, to provide a substantially aerodynamically smooth transition therebetween.

3. The system of claim 2, in which each said edge portion carries a flexible seal that sealingly engages the adjacent fairing when the control surface is in its neutral position.

4. The system of claim 2, in which the airfoil is an airplane wing and the control surface is mounted on a trailing edge of said wing, and said one of said fairings is an upper fairing carried by the control surface.

5. The system of claim 2, in which the control surface pivots about a hinge axis between said neutral position and said deployed positions; the airfoil has a chord line at each point along said axis; and, when the control surface is in its neutral position, said fairings extend at each point along said axis in opposite directions past a plane perpendicular to said chord line and intersecting said axis.

6. The system of claim 5, in which each said edge portion carries a flexible seal that sealingly engages the adjacent fairing when the control surface is in its neutral position.

7. The system of claim 5, in which the airfoil is an airplane wing and the control surface is mounted on a trailing edge of said wing, and said one of said fairings is an upper fairing carried by the control surface.

8. The system of claim 1, in which each said edge portion carries a flexible seal that sealingly engages the adjacent fairing when the control surface is in its neutral position.

9. The system of claim 1, in which the airfoil is an airplane wing and the control surface is mounted on a trailing edge of said wing, and said one of said fairings is an upper fairing carried by the control surface.

10. The system of claim 1, in which the control surface pivots about a hinge axis between said neutral position and said deployed positions; the airfoil has a chord line at each point along said axis; and, when the control surface is in its neutral position, said fairings extend at each point along said axis in opposite directions past a plane perpendicular to said chord line and intersecting said axis.

11. The system of claim 10, in which the airfoil is an airplane wing and the control surface is mounted on a trailing edge of said wing, and said one of said fairings is an upper fairing carried by the control surface.

12. The system of claim 1, in which the control surface is a leading edge flap and the airfoil is a supersonic airplane wing, said fairings comprise an upper fairing and a lower fairing, and said upper fairing is said one of said fairings.

13. The system of claim 12, in which the control surface pivots downwardly into its first deployed position; and, as the control surface moves between its neutral position and its first deployed position and when the control surface is in either of said neutral and first deployed positions, said lower fairing is continuously sufficiently close to the adjacent edge portion to provide a substantially aerodynamically smooth transition therebetween.

14. The system of claim 12, in which the control surface pivots downwardly into its first deployed position; and, as the control surface moves between its neutral position and its first deployed position and when the control surface is in either of said neutral and first deployed positions, said lower fairing is continuously sufficiently close to the adjacent edge portion to provide a substantially aerodynamically smooth transition therebetween and said upper fairing is continuously sealingly engaged by the adjacent edge portion.

15. The system of claim 12, in which the control surface pivots downwardly into its first deployed position; and, as the control surface moves between its neutral position and its first deployed position and when the control surface is in either of said neutral and first deployed positions, said upper fairing is continuously sealingly engaged by the adjacent edge portion.

16. The system of claim 15, in which said upper fairing is carried by said wing.

17. The system of claim 12, in which said upper fairing is carried by said wing.

18. A system for providing a smooth transition between a fixed airfoil of an aircraft and a movable control surface mounted on the fixed airfoil, said control surface having a neutral position and being movable in a first direction to a first deployed position and in a second opposite direction to a second deployed position, said system comprising:

first and second fairings carried by the airfoil and the control surface, respectively and;

first and second edge portions carried by, and fixed in position relative to, the airfoil and the control surface, respectively, opposite the fairing carried thereby; said first and second edge portions being positioned adjacent to said second and first fairings, respectively;

said fairings and said edge portions together defining an interface between the airfoil and the control surface; and at least one of said fairings being curved and overlapping the adjacent edge portion when the control surface is in its neutral position, and having an outer surface that is sealingly engaged by the adjacent edge portion when the control surface is in either of its neutral position and one of said deployed positions, said outer surface being sufficiently close to the adjacent edge portion when the control surface is in the other of said deployed positions to provide a substantially aerodynamically smooth transition between said outer surface and the adjacent edge portion; and the other of said fairings having an outer surface that is sealingly engaged by the adjacent edge portion when the control surface is in its neutral position;

in which each said edge portion carries a flexible seal that sealingly engages the adjacent fairing when the control surface is in its neutral position; and in which each said edge portion has a tapered end with an inwardly facing recess formed therein, and said seal is positioned in said recess to help maximize the smoothness of the transition between the airfoil and the control surface.

19. The system of claim 18, in which each said fairing is curved and overlaps the adjacent edge portion when the control surface is in its neutral position; and said outer surface of said other of said fairings is sealingly engaged by the adjacent edge portion when the control surface is in said other of said deployed positions, and is sufficiently close to the adjacent edge portion, when the control surface is in said one of said deployed positions, to provide a substantially aerodynamically smooth transition therebetween.

20. The system of claim 19, in which the control surface pivots about a hinge axis between said neutral position and said deployed positions; the airfoil has a chord line at each point along said axis; and, when the control surface is in its neutral position, said fairings extend at each point along said axis in opposite directions past a plane perpendicular to said chord line and intersecting said axis.

21. A system for providing a smooth transition between a fixed airfoil of an aircraft and a movable control surface mounted on the fixed airfoil, said control surface having a neutral position and being movable in a first direction to a first deployed position and in a second opposite direction to a second deployed position, said system comprising:

first and second fairings carried by the airfoil and the control surface, respectively; and first and second edge portions carried by, and fixed in position relative to, the airfoil and the control surface, respectively, opposite the fairing carried thereby; said first and second edge portions being positioned adjacent to said second and first fairings, respectively;

said fairings and said edge portions together defining an interface between the airfoil and the control surface; and at least one of said fairings being curved and overlapping the adjacent edge portion when the control surface is in its neutral position, and having an outer surface that is sealingly engaged by the adjacent edge portion when the control surface is in either of its neutral position and one of said deployed positions, said outer surface being sufficiently close to the adjacent edge portion when the control surface is in the other of said deployed positions to provide a substantially aerodynamically smooth transition between said outer surface and the adjacent edge portion; and the other of said fairings having an outer surface that is sealingly engaged by the adjacent edge portion when the control surface is in its neutral position;

in which the control surface is a leading edge flap and the airfoil is a supersonic airplane wing, said fairings comprise an upper fairing and a lower fairing, and said upper fairing is said one of said fairings; and in which the edge portion that engages said upper fairing has a tapered end with an inwardly facing recess formed therein, and which comprises a seal positioned in said recess.

22. The system of claim 21, in which the control surface pivots downwardly into its first deployed position: and, as the control surface moves between its neutral position and its first deployed position and when the control surface is in either of said neutral and first deployed positions, said lower fairing is continuously sufficiently close to the adjacent edge portion to provide a substantially aerodynamically smooth transition therebetween.

23. The system of claim 22, in which, as the control surface moves between its neutral position and its first deployed position and when the control surface is in either of said neutral end first deployed positions, said upper fairing is continuously sealingly engaged by the adjacent edge portion.

24. The system of claim 21, in which the control surface pivots downwardly into its first deployed position: and, as the control surface moves between its neutral position and its first deployed position and when the control surface is in either of said neutral and first deployed positions, said upper fairing is continuously sealingly engaged by the adjacent edge portion.

25. The system of claim 24, in which said upper fairing is carried by said wing.

26. A system for providing a smooth transition between a fixed airfoil of an aircraft and a movable control surface mounted on the fixed airfoil, said control surface having a neutral position and being movable into a deployed position, said system comprising:

first and second curved fairings carried by the airfoil and the control surface, respectively; and first and second edge portions carried by, and fixed in position relative to, the airfoil and the control surface, respectively, opposite the fairing carried thereby; said first and second edge portions being positioned adjacent to said second and first fairings, respectively;

said fairings and said edge portions together defining an interface between the airfoil and the control surface; and at least one of said fairings overlapping the adjacent edge portion when the control surface is in its neutral position, and having an outer surface that is sealingly engaged by the adjacent edge portion when the control surface is in its neutral position and is sufficiently close to the adjacent edge portion when the control surface is in its deployed position to provide a substantially aerodynamically smooth transition between said outer surface and the adjacent edge portion; and the other of said fairings having an outer surface that is sufficiently close to the adjacent edge portion to provide a substantially aerodynamically smooth transition between said outer surface of said other of said fairings and the adjacent edge portion when the control surface is in either of its neutral position and its deployed position.

27. The system of claim 26, in which said outer surface of said one of said fairings is sealingly engaged by the adjacent edge portion when the control surface is in its deployed position.

28. The system of claim 27, in which said outer surface of said other of said fairings is sealingly engaged by the adjacent edge portion when the control surface is in its neutral position.

29. The system of claim 26, in which said outer surface of said other of said fairings is sealingly engaged by the adjacent edge portion when the control surface is in its neutral position.

30. The system of claim 26, in which the control surface pivots about a hinge axis between said neutral position and said deployed position; the airfoil has a chord line at each point along said axis; and, when the control surface is in its neutral position, said fairings extend at each point along said axis in opposite directions past a plane perpendicular to said chord line and intersecting said axis.

31. The system of claim 26, in which the control surface is a leading edge flap and the airfoil is a supersonic airplane wing, said fairings comprise an upper fairing and a lower fairing, and said upper fairing is said one of said fairings.

32. A system for providing a smooth transition between a fixed airfoil of an aircraft and a movable control surface mounted on the fixed airfoil, said control surface having a neutral position and being movable into a deployed position, said system comprising:
  first and second curved fairings carried by the airfoil and the control surface, respectively; and
  first and second edge portions carried by, and fixed in position relative to, the airfoil and the control surface, respectively, opposite the fairing carried thereby; said first and second edge portions being positioned adjacent to said second and first fairings, respectively;
  said fairings and said edge portions together defining an interface between the airfoil and the control surface; and
  at least one of said fairings overlapping the adjacent edge portion when the control surface is in its neutral position, and having an outer surface that is sealingly engaged by the adjacent edge portion when the control surface is in its neutral position and is sufficiently close to the adjacent edge portion when the control surface is in its deployed position to provide a substantially aerodynamically smooth transition between said outer surface and the adjacent edge portion: and the other of said fairings having an outer surface that is sufficiently close to the adjacent edge portion to provide a substantially aerodynamically smooth transition between said outer surface of said other of said fairings and the adjacent edge portion when the control surface is in either of its neutral position and its deployed position;
  in which the edge portion that engages said one of said fairings has a tapered end with an inwardly facing recess formed therein, and which comprises a seal positioned in said recess.

* * * * *

UNITED STATES PATENT AND TRADEMARK OFFICE
CERTIFICATE OF CORRECTION

PATENT NO. : 5,388,788
DATED : February 14, 1995
INVENTOR(S) : Peter K. C. Rudolph It is certified that error appears in the above-identified patent and that said Letters Patent is hereby corrected as shown below:

Column 10, line 2, delete the period after "both".

Claim 22, column 14, lines 24 and 25, "position:" should be -- position; --.

Claim 23, column 14, line 35, "end" should be -- and --.

Claim 24, column 14, lines 39 and 40, "position:" should be -- position; --.

Claim 32, column 16, line 26, "portion:" should be -- portion; --.

Signed and Sealed this

Twenty-seventh Day of June, 1995

BRUCE LEHMAN

*Attest:*

*Attesting Officer*     *Commissioner of Patents and Trademarks*